United States Patent
Teglia

(10) Patent No.: US 8,720,600 B2
(45) Date of Patent: *May 13, 2014

(54) METHOD OF DETECTING A FAULT ATTACK

(75) Inventor: Yannick Teglia, Belcodene (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 461 days.

This patent is subject to a terminal disclaimer.

(21) Appl. No.: 12/943,460

(22) Filed: Nov. 10, 2010

(65) Prior Publication Data

US 2011/0119532 A1 May 19, 2011

(30) Foreign Application Priority Data

Nov. 18, 2009 (FR) ...................................... 09 58140

(51) Int. Cl.
*G06F 7/04* (2006.01)

(52) U.S. Cl.
USPC ........... 173/176; 713/177; 713/178; 713/179; 726/23; 726/24; 726/25; 726/26

(58) Field of Classification Search
USPC ............................. 380/2; 173/176
See application file for complete search history.

(56) References Cited

U.S. PATENT DOCUMENTS

| | | | | |
|---|---|---|---|---|
| 4,870,681 A * | 9/1989 | Sedlak | .............................. | 380/30 |
| 2006/0045264 A1* | 3/2006 | Kocher et al. | ................... | 380/37 |
| 2006/0177052 A1* | 8/2006 | Hubert | ............................. | 380/29 |
| 2007/0019805 A1* | 1/2007 | Karpovsky et al. | ............. | 380/28 |
| 2007/0286413 A1* | 12/2007 | Derouet | .......................... | 380/28 |
| 2010/0153712 A1* | 6/2010 | Gentry | .......................... | 713/156 |
| 2011/0029784 A1 | 2/2011 | Genelle et al. | | |
| 2011/0119762 A1* | 5/2011 | Teglia | ............................. | 726/23 |

FOREIGN PATENT DOCUMENTS

FR 2841015 A1 12/2003

OTHER PUBLICATIONS

French Search Report dated Jun. 16, 2010 from corresponding French Application No. 09/58140.
French Search Report dated Jun. 16, 2010 from related French Application No. 09/58141.
French Search Report dated Jun. 16, 2010 from related French Application No. 09/58142.
Bertoni G., et al., *Error Analysis and Detection Procedures for a Hardware Implementation of the Advanced Encryepetion Standard*, IEEE Transactions on computers, IEEE Service Center, Los Alamitos, CA LNKD-DOI:10.1109/TC, 2003.1190590; vol. 52, No. 4, Apr. 1, 2003, pp. 492-505; XP011095866.

(Continued)

*Primary Examiner* — Longbit Chai
(74) *Attorney, Agent, or Firm* — Wolf, Greenfield & Sacks, P.C.

(57) ABSTRACT

A method of detecting a fault attack including generating a first signature of a first group of data values by performing a single commutative non-Boolean arithmetic operation between all the data values of the first group; generating a second set of data values by performing a permutation of the first set of data values; generating a second signature of the second group of data values by performing said single commutative non-Boolean arithmetic operation between all the data values of the second group; and comparing the first and second signatures to detect a fault attack.

14 Claims, 2 Drawing Sheets

(56) References Cited

OTHER PUBLICATIONS

Karpovsky M. et al., *Robust Protection Against Fault-Injection Attacks on Smart Cards Implementing the Advanced Encryption Standard,* Dependable Systems and Network, 2004 international Conference on florence, Italy, Jun. 28-Jul. 1, 2004, Piscataway, NJ, IEEE LNKD-DOI:10 11/09/DSN, 2004.1311880, Jun. 28, 2004, pp. 82-90, XP010710793.

Hagai Barr-El, et al., *The Sorcer's Apprentice Guide to Fault Attacks,* Internet Citation, Oct. 16, 2004, XP002329915.

Karri, R et al., *Concurrent Error Detection Schemes Our Fault-Based Side-Channel Cryptanalysis Of Symmetric Block Ciphers,* IEEE Transactions on computer-Aided Design of Integrated Circuits and Systems, Dec. 16, 2002, pp. 1509-1517, XP0025587894.

\* cited by examiner

METHOD OF DETECTING A FAULT ATTACK

CROSS REFERENCE TO RELATED APPLICATIONS

This application claims the priority benefit of French patent application Ser. No. 09/58140, filed on Nov. 18, 2009, entitled "Method of Detecting a Fault Attack," which is hereby incorporated by reference to the maximum extent allowable by law.

BACKGROUND OF THE INVENTION

1. Field of the Invention

The present invention relates to a method and circuitry for detecting fault attacks, and in particular to method and circuitry providing detection based on signatures.

2. Discussion of the Related Art

Integrated circuits may comprise circuitry that is considered sensitive in view of the security of the data it manipulates, such as authentication keys, signatures, etc., or in view of the algorithms it uses, such as encryption or decryption algorithms. Such information is desired to be kept secret, meaning that it should not be communicated to or otherwise be detectable by third parties or unauthorized circuits.

A common process for pirating information manipulated by an integrated circuit consists in detecting the zones of the circuit that are used during the processing of that information. For this, the circuit is activated or placed in a functional environment and data packets to be encoded are introduced at an input. While the data is being processed, the surface of the integrated circuit is swept by a laser to inject faults in the functioning of the circuit. By analysing in parallel the outputs of the circuit, this enables the zones of the circuit that process the data to be determined. Having localized these zones, the pirate can concentrate attacks on these zones in order to determine the secret data being processed.

Signatures provide a way of protecting a circuit against fault attacks. A signature is generated based on one or more data values that will be used by an algorithm. A signature is then generated on the same data values after they have been used by the algorithm. A difference in the two signatures will indicate the occurrence of an attack. Once the detection circuit has detected such an attack, it can trigger a counter measure, such as resetting the circuit, and/or incrementing a counter, which renders the integrated circuit permanently inactive once a certain number of faults have been detected.

Side channel attacks are a different type of attack involving, for example, measuring the power consumption of a circuit. Blinding provides a way of protecting a circuit against side channel attacks. Blinding involves altering the inputs of an algorithm using a random variable in a non-destructive fashion.

It would be desirable to provide circuits in which the same group of data values can be used to generate signatures to detect fault attacks and be blinded to make side channel attacks harder. However, there are difficulties in implementing effective circuits that combine these functions.

SUMMARY OF THE INVENTION

It is an aim of embodiments of the present invention to at least partially address one or more problems in the prior art.

According to one embodiment of the present invention, there is provided a method of detecting a fault attack comprising: generating a first signature of a first group of data values by performing a single commutative non-Boolean arithmetic operation between all the data values of the first group; generating a second group of data values by performing a permutation of the first group of data values; generating a second signature of the second group of data values by performing said single commutative non-Boolean arithmetic operation between all the data values of the second group; and comparing the first and second signatures to detect a fault attack.

According to one embodiment, the first signature and second signature are generated based on the following calculation: $S_1 = D_1 + D_2 + \ldots + D_N$, $S_2 = D_1' + D_2' + \ldots + D_N'$, wherein $D_1$ to $D_N$ are the data values of the first group and $D_1'$ to $D_N'$ are the data values of the second group.

According to another embodiment, the first signature $S_1$ and second signature $S_2$ are generated based on the following calculation: $S_1 = D_1 \times D_2 \times \ldots \times D_N$, $S_2 = D_1' \times D_2' \times \ldots \times D_N'$, wherein $D_1$ to $D_N$ are the data values of the first group and $D_1'$ to $D_N'$ are the data values of the second group.

According to another embodiment, said permutation the first group of data values is performed by applying the exclusive OR between each data value of the first group and a blinding value.

According to another embodiment, said permutation of the first group of data values is performed by shifting the address of each data value by a blinding value.

According to another embodiment of the present invention, there is provided a circuit for detecting a fault attack comprising: a blinding block arranged to generate a second group of data values by performing a permutation of a first group of data values; a signature unit arranged to generate a first signature of the first group of data values by performing a single commutative non-Boolean arithmetic operation between all the data values of the first group and a second signature of the second group of data values by performing said single commutative non-Boolean arithmetic operation between all the data values of the second group; and a comparator arranged to compare the first and second signatures to detect a fault attack.

According to another embodiment of the present invention, there is provided an integrated circuit comprising: a cryptographic block arranged to perform a cryptographic operation on the blinded first group of data values; and the above circuitry.

According to an embodiment, the first group of data values is an SBOX used during a DES or AES cryptographic operation.

According to another embodiment of the present invention, there is provided an IC card comprising the above integrated circuit.

According to another embodiment aspect of the present invention, there is provided an IC card reader comprising the above integrated circuit.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which.

DETAILED DESCRIPTION

For clarity, only those steps and elements useful in an understanding of the invention have been represented in the figures and will be described in detail. In particular, the circuitry for resetting an integrated circuit or rendering it inactive upon detection of one or more fault injections has not been detailed, the invention being applicable to any such circuits. Furthermore, the primary functions of the integrated circuit being protected have not been described in detail, the invention being compatible with integrated circuits implementing any sensitive functions, such as encryption or decryption, or other functions involving sensitive data.

Figure 1:
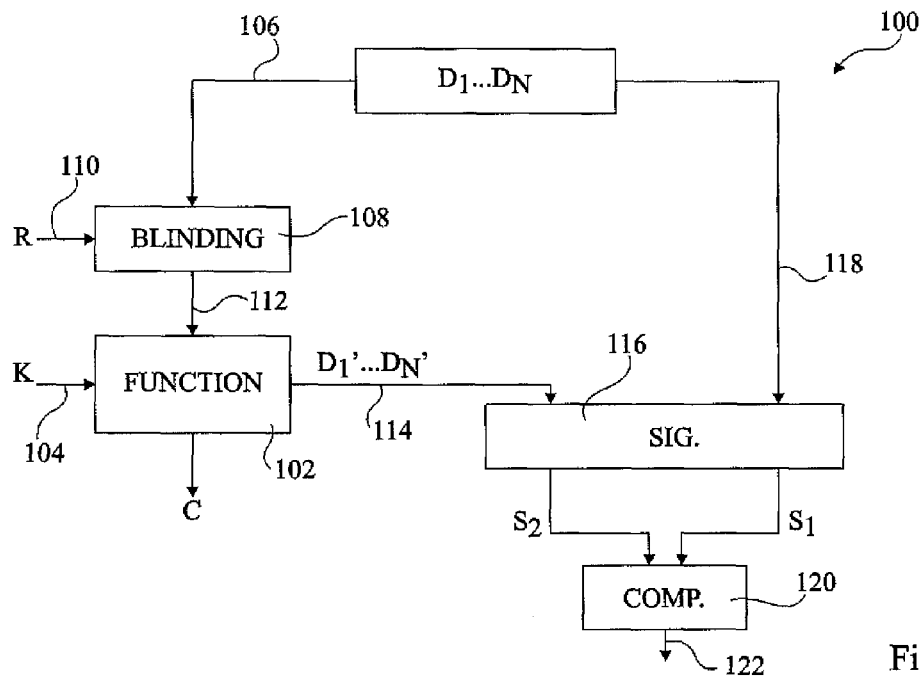
FIG. 1 illustrates a circuit for detecting fault attacks according to an embodiment of the present invention.

FIG. 1 illustrates a circuit 100 comprising a function unit 102, which, for example, implements an algorithm involving sensitive data, such as an encryption key or the like. In the present example, unit 102 receives a key K on an input line 104.

A group of data values $D_1$ to $D_N$ are provided on a line 106 to a blinding block 108, which applies a blinding algorithm on these data values based on a blinding value R provided on an input line 110 to the blinding block 108. The blinding value R is for example a pseudo-random value. The blinded data values $D_1'$ to $D_N'$ are then provided on a line 112 to the function unit 102. Function unit 102 implements an algorithm that uses the blinded data values $D_1'$ to $D_N'$, and outputs a result C, which could be an encrypted or decrypted data block, or other value.

While being used by function unit 102, the blinded data values $D_1'$ to $D_N'$ are for example stored in a register. At various stages during execution of the algorithm by the function block 102, and/or at the end of this execution, the blinded values $D_1'$ to $D_N'$ are output on a line 114 to a signature block 116. The original data values $D_1$ to $D_N$ are also provided to the signature block 116 on a line 118.

Signature block 116 generates a signature $S_1$ based on the original data values $D_1$ to $D_N$, and a signature $S_2$ based on the blinded data values $D_1'$ to $D_N'$. The signatures $S_1$ and $S_2$ are then compared by a comparator 120, which provides an output on an output line 122 indicating whether or not the signatures match.

The blinding scheme implemented by block 108 and the signature algorithm used by block 116 to generate each of the signatures are chosen such that in the absence of a fault attack, the signatures match. Thus any fault attack aimed at the functional unit 102 is likely to alter one of the blinded data values $D_1'$ to $D_N'$.

The blinding scheme implemented by blinding block 108 is chosen to implement a permutation of the data values $D_1$ to $D_N$. In other words, all the values present in the blinded data value group $D_1'$ to $D_N'$ are also present in the original data group $D_1$ to $D_N$. An example of such a blinding scheme is the XOR function, for a blinding value of the same length as the data values $D_1$ to $D_N$ and applied bit by bit between each of the data values and the blinding value R, assuming for example that each possible value is represented. More generally, blinding with the XOR function causes a permutation when the values represented in the blinded data values $D_1'$ to $D_N'$ are present an equal number of times in the corresponding blinded data value $D_1'$ to $D_N'$. In other words, calling the data values $D_1$ to $D_N$ the set A, and assuming a blinding value R, the following condition should hold:

for i=1 to N, $V=D_i$ and $V=D_i$ XOR R, V should be present in A the same number of times as V is present in A.

For example, the data values of the group $D_1$ to $D_N$ could comprise a complete set of all the possible values for a given bit length. In other words, assuming each data value $D_1$ to $D_N$ is n bits long, each of the values 0 to $2^{(n-1)}$ occurs once in the data values $D_1$ to $D_N$. In this case, it follows that all of these values will also be present once in the blinded group $D_1'$ to $D_N'$, and thus the blinding operation results in a permutation of the data values, without adding or removing new values.

Alternatively, in the case that the data values $D_1$ to $D_N$ do not meet condition 1 above, the blinding function 108 could, for example, alter the order of the data values, based on the blinding value R. For example, the blinding value R, which is the same for all of the data values $D_1$ to $D_N$, could be used to shift the position of the respective data values by R places.

The signature algorithm applied by signature block 116 is chosen to be a single commutative non-Boolean arithmetic operation applied, for signature $S_1$, between all the data values of the group $D_1$ to $D_N$, and for signature $S_2$, between all the data values of the group $D_1'$ to $D_N'$. In particular, while it would be possible to use a commutative Boolean function, such as XOR function calculated as follows for signature $S_1$:

$$S_1 = D_1 \text{ XOR } D_1 \text{ XOR } D_2 \text{ XOR } \ldots \text{ XOR } D_N,$$

such a scheme lacks effectiveness against certain attacks. In particular, a simple Boolean function, such as the XOR function, applied between two n-bit values will not register a difference where the $k^{th}$ bit of each value is flipped. For example, the XOR of two values computes the Hamming distance between them, and thus if they change by the same amount, the Hamming distance remains the same.

The present inventors have found that an arithmetic non-Boolean function has much greater effectiveness for detecting such faults.

Figure 2:
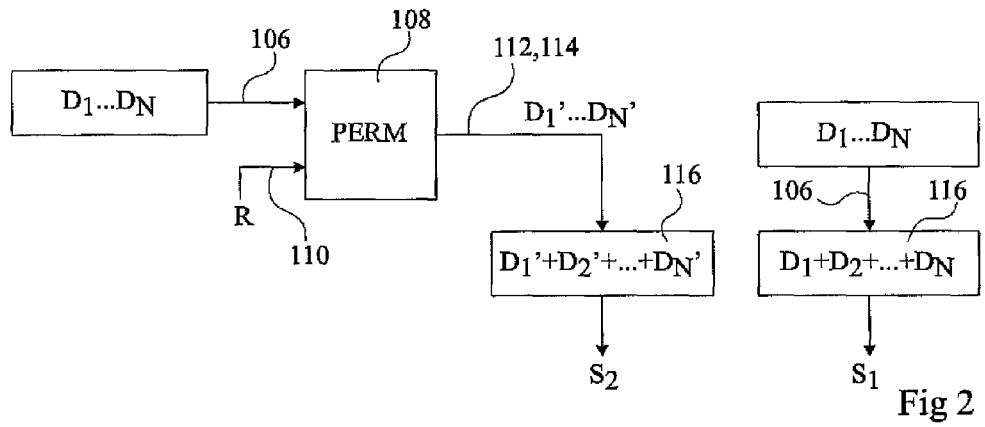
FIGS. 2 and 3 illustrate the circuit of FIG. 1 in more detail according to alternative embodiments.
Figure 3:
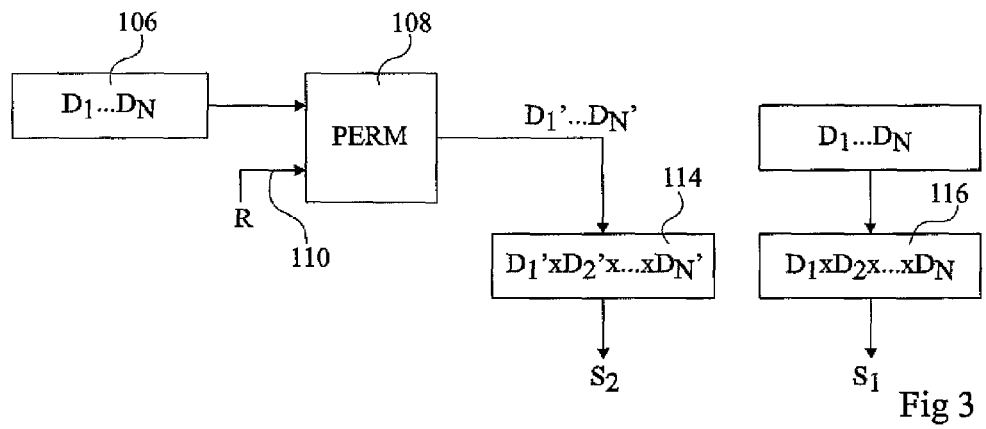

FIGS. 2 and 3 illustrate examples of the circuit 100 in which the blinding block 108 performs a permutation on the data values $D_1$ to $D_N$, for example by applying an XOR function, using the blinding value R.

Furthermore, as shown in FIG. 2, the blinded data values $D_1'$ to $D_N'$ at the output of the permutation block 108 are provided to the signature block 116, which in this example performs an addition of each of the data values $D_1'$ to $D_N'$. Furthermore, before or after generation of signature $S_2$, the signature block 116 generates the signature $S_1$, by adding together each of the original data values $D_1$ to $D_N$. Thus $S_1$ and $S_2$ are calculated as follows:

$$S_1 = D_1 + D_2 + \ldots + D_N; \text{ and}$$

$$S_2 = D_1' + D_2' + \ldots + D_N'$$

This addition is a commutative operation meaning that the order that the addition is performed will not affect the result. The result of this addition will, for example, be a value represented in a greater number of bits that each of the data values $D_1$ to $D_N$. Assuming each of the data values $D_1$ to $D_N$ has a bit length equal to n, the signatures $S_1$ and $S_2$ are, for example, represented by P bits, where:

$$P = n \log_2(N) + 1$$

where N is the total number of data values $D_1$ to $D_N$, and For example, assuming 16 data values each having 4 bits, the signatures $S_1$ and $S_2$ are each for example represented in 17 bits.

As shown in FIG. 3, the blinded data values $D_1'$ to $D_N'$ at the output of the permutation block 108 are provided to the signature block 116, which in this example performs a multiplication of each of the data values $D_1'$ to $D_N'$. Furthermore, before or after generation of signature $S_2$, the signature block 116 generates the signature $S_1$, by multiplying together each of the original data values $D_1$ to $D_N$. Thus $S_1$ and $S_2$ are calculated as follows:

$$S_1 = D_1 \times D_2 \times \ldots \times D_N; \text{ and}$$

$$S_2 = D_1' \times D_2' \times \ldots \times D_N'.$$

This multiplication is a commutative operation meaning that the order that the multiplication is performed will not affect the result. The signatures resulting from this multiplication will, for example, be values each represented in a greater number of bits than the number of bits of the data values $D_1$ to $D_N$. Assuming each of the data values $D_1$ to $D_N$ has a bit length equal to n, the signatures $S_1$ and $S_2$ are, for example, presented by P bits, where:

$$P = n^N + 1$$

where N is the total number of data values $D_1$ to $D_N$. For example, assuming 16 data values each having 4 bits, the signatures $S_1$ and $S_2$ will each be represented in 64 bits.

In practise, a length m is for example defined as the bit length of the result of the addition of FIG. 2 or the multiplication of FIG. 3, m being greater that n, but less than P, giving a good compromise for providing a uniform distribution of outputs.

Alternative non-Boolean commutative arithmetic operations could be used to determine the signatures. For example, a combination of an addition and multiplication could be used, such as the product of all the data values added to or multiplied by the sum of all the data values. Additionally or alternatively, to reduce the overall length of the product, only a certain number of bits, such as the 16 least significant bits of the sum and/or product are stored as the signature.

As a further example, an alternative non-Boolean commutative arithmetic operation would be as follows:

$$S_1 = D_1^k \times D_2^k \times \ldots \times D_N^k; \text{ and}$$

$$S_2 = D_1'^k \times D_2'^k \times \ldots \times D_N'^k$$

where k is a constant value.

Figure 4:
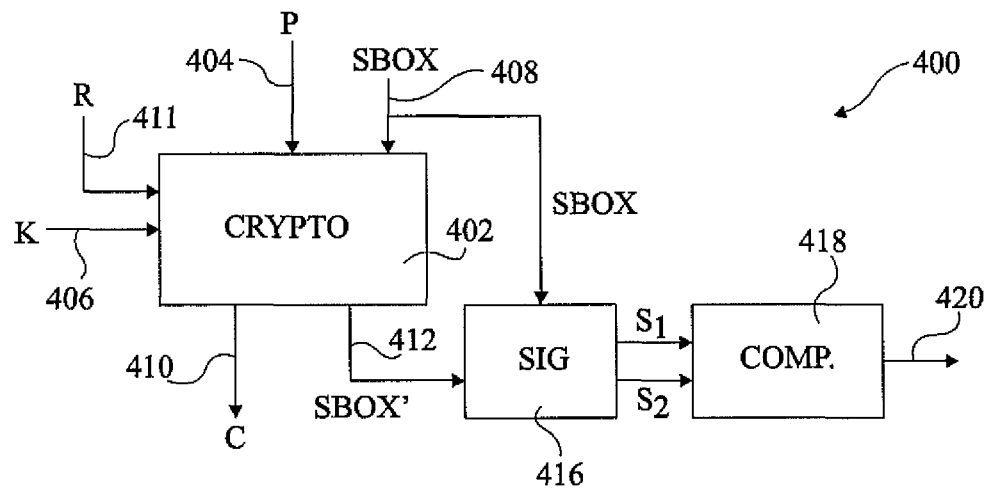
FIG. 4 illustrates an example of an application of the circuit of FIG. 1.

FIG. 4 illustrates circuitry 400 showing a particular application of the circuitry 100 of FIG. 1, in which the function block is a cryptographic block 402 implementing a cryptographic algorithm, such as an encryption or decryption operation. For example, block 402 performs a DES or AES algorithm, based on input data packets P arriving on an input line 404, a secret key K received on an input line 406, and an SBOX table received on an input line 408. The cryptographic block 402 for example generates an output data packet C, provided on an output line 410.

In this embodiment, the SBOX comprises the data values $D_1$ to $D_N$. The SBOX used in such algorithms is in the form of a table used for performing a translation on input data. The SBOX can be public, and for example comprises 256 bytes of data, each of 8 bits. The values in the SBOX comprise a complete set of values for the given number of bits, in other words, assuming each data value is 8 bits, comprising all the value from "00000000" to "11111111".

In this embodiment, the cryptographic block 402 performs the blinding is operation on the SBOX on line 408, by performing the XOR between each value of the SBOX and a blinding value R received on an input line 411. Then, at a particular stage during processing of the cryptographic algorithm, for example at the same time as or before the packet C is outputted, the blinded SBOX is provided on an output line 412 to the signature block 416. The signature block 416 generates the signature $S_2$ using each value of the blinded SBOX. In parallel or beforehand, the signature block 416 generates a signature of the original SBOX received on line 408. The signatures $S_1$ and $S_2$ are compared by the comparator 418, which provides an output on line 420 indicating whether a mismatch between the signatures has been detected, indicating a fault in the original SBOX or the blinded SBOX.

Figure 5:
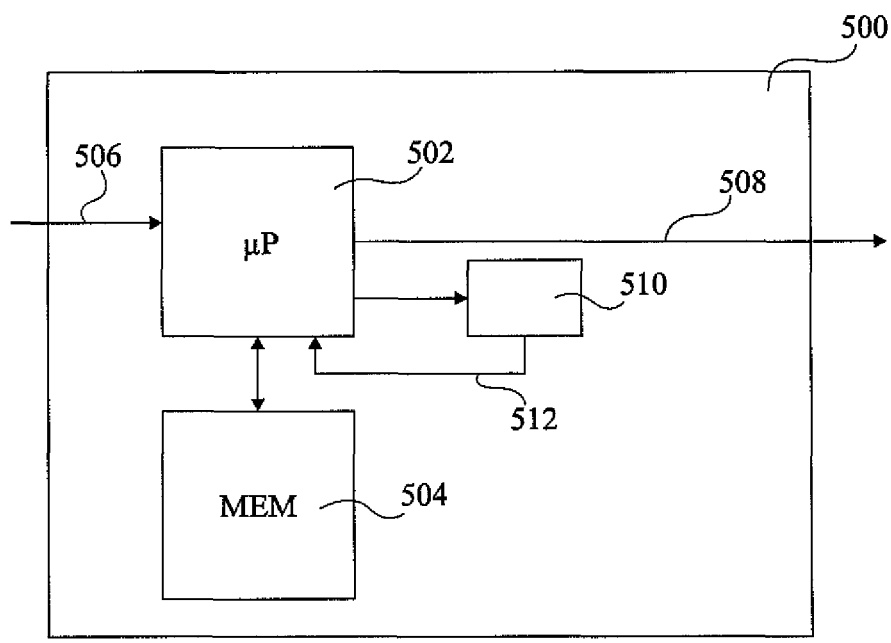
FIG. 5 illustrates an electronic device comprising circuitry for detecting fault attacks according to an embodiment of the present invention.

FIG. 5 illustrates an electronic device 500 comprising a microprocessor 502, a memory block 504, and an input line 506, which provides input values to the microprocessor 502. The microprocessor 502 provides output values on an output line 508. Furthermore, protection circuitry 510 comprises the signature block, comparator and/or blinding block described herein. This circuitry 510 provides an alert signal on an output line 512 provided back to the microprocessor 502, which for example triggers a reset of the microprocessor 502 and/or increments a counter, which will permanently deactivate the microprocessor once a certain count value has been reached.

The electronic device 500 is, for example, an IC card, such as a smart card, an IC card reader, such as a credit card payment terminal, or a set-top box, a hard disk for a PC or laptop computer, a PC or laptop computer, a vending machine or other device handling sensitive information.

An advantage of embodiments described herein is that, by generating signatures by performing a commutative non-Boolean numerical arithmetic operation between all the data values of a permutated group and a non-permutated group, fault detection that is effective and relatively easily implemented is achieved. In particular, the signature scheme is particularly effective at detecting errors which, in other types of signature schemes, would not be detected.

A particular advantage of generating the signatures based on an addition is that it is easy to implement, and it is more effective than signatures using Boolean operators. In particular, the same fault injected into the same bit position of two of the data values will be detectable. For example, if two data values equal 5 and 6, and a fault is injected into each so that the values become 1 and 2, the XOR before and after the fault injection will still result in "0011", whereas the addition of these values will change from 11 to 3, thereby indicating a fault.

An advantage of generating the signatures based on a multiplication of all the data values is that even opposite faults injected into the same bit position of different values can be detected. For example, if two data values equal 5 and 6, and each has a fault injected into its least significant bit, the values will become 4 and 7 respectively. The addition of these values will still equal 11, but the multiplication of these values will have gone from being equal to 30 to 28, thereby indicating a fault.

While a number of particular embodiments of the present invention have been described, it will be apparent to those skilled in the art that numerous variations and alterations may be applied.

For example, it will be apparent to those skilled in the art that the embodiments described herein could be applied to a broad range of circuits in which signature verification is used to detect faults.

Furthermore, it will be apparent to those skilled in the art the embodiments described herein could be implemented in software, hardware or a combination thereof. Additionally, the features described in relation to the various embodiments could be combined in any combination in alternative embodiments.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of detecting a fault attack, the method comprising:

using at least one processor:

generating a first signature of a first group of data values, the first group of data values having a first order, by performing a single commutative non-Boolean arithmetic operation between all the data values of the first group;

generating a second group of data values by performing a permutation of the first group of data values, the second group of data values containing the data values of the first group of data values in a second order, different from the first order;

generating a second signature of the second group of data values by performing said single commutative non-Boolean arithmetic operation between all the data values of the second group; and comparing the first and second signatures to detect a fault attack.

2. The method of claim 1, wherein the first signature and second signature are generated based on the following calculation:

$$S_1 = D_1 + D_2 + \ldots + D_N, S_2 = D_1' + D_2' + \ldots + D_N'$$

wherein $D_1$ to $D_N$ are the data values of the first group, $D_1'$ to $D_N'$ are the data values of the second group, and N is an integer.

3. The method of claim 1, wherein the first signature and second signature are generated based on the following calculation:

$$S_1 = D_1 \times D_2 \times \ldots \times D_N, S_2 = D_1' \times D_2' \times \ldots \times D_N'$$

wherein $D_1$ to $D_N$ are the data values of the first group, $D_1'$ to $D_N'$ are the data values of the second group, and N is an integer.

4. The method of claim 1, wherein said permutation of the first group of data values is performed by applying the exclusive OR between each data value of the first group and a blinding value.

5. The method of claim 1, wherein said permutation of the first group of data values is performed by shifting an address of each data value by a blinding value.

6. A circuit for detecting a fault attack, the circuit comprising:

a blinding circuit arranged to generate a second group of data values by performing a permutation of a first group of data values, wherein the first group of data values has a first order, and wherein the second group of data values contains the first group of data values in a second order, different from the first order;

a signature circuit arranged to generate a first signature of the first group of data values by performing a single commutative non-Boolean arithmetic operation between all the data values of the first group and a second signature of the second group of data values by performing said single commutative non-Boolean arithmetic operation between all the data values of the second group; and a comparator circuit arranged to compare the first and second signatures to detect a fault attack.

7. An integrated circuit comprising:

a cryptographic circuit arranged to perform a cryptographic operation on the blinded first group of data values; and the circuit of claim 6.

8. The integrated circuit of claim 7, wherein said first group of data values is a Substitution-Box (SBOX) used during a Data Encryption Standard (DES) or Advanced Encryption Standard (AES) cryptographic operation.

9. An integrated circuit (IC) card comprising the integrated circuit of claim 7.

10. An integrated circuit (IC) card reader comprising the integrated circuit of claim 7.

11. At least one non-transitory processor readable storage medium storing processor executable instructions which, when executed by at least one processor, cause the at least one processor to perform a method comprising:

generating a first signature of a first group of data values, the first group of data values having a first order, by performing a commutative non-Boolean arithmetic operation between at least some of the data values of the first group of data values;

generating a second signature of a second group of data values by performing said commutative non-Boolean arithmetic operation between at least some of the data values of the second group of data values, wherein the second group of data values contains the data values of the first group of data values in a second order, different from the first order; and comparing the first and second signatures.

12. The at least one non-transitory processor readable storage medium of claim 11, wherein the second group of data values is generated by performing a permutation of the first group of data values.

13. The at least one non-transitory processor readable storage medium of claim 11, wherein the first signature is generated based on a non-Boolean addition between at least some of the data values of the first group of data values.

14. The at least one non-transitory processor readable storage medium of claim 11, wherein the first signature is generated based on a non-Boolean multiplication between at least some of the data values of the first group of data values.

* * * * *

UNITED STATES PATENT AND TRADEMARK OFFICE
CERTIFICATE OF CORRECTION

| | | |
|---|---|---|
| PATENT NO. | : 8,720,600 B2 | Page 1 of 1 |
| APPLICATION NO. | : 12/943460 | |
| DATED | : May 13, 2014 | |
| INVENTOR(S) | : Yannick Teglia | |

It is certified that error appears in the above-identified patent and that said Letters Patent is hereby corrected as shown below:

In the Specification

\*\*\* At Col. 4, line 1, the second and third occurrence of "V" should read --V'--;
At Col. 4, line 51, "2" should read --2'--; and (second occurrence)
At Col. 5, line 61, the word "is" should be deleted. \*\*\*

Signed and Sealed this
Ninth Day of September, 2014

Michelle K. Lee
*Deputy Director of the United States Patent and Trademark Office*